United States Patent
Wang

(10) Patent No.: US 9,389,649 B2
(45) Date of Patent: Jul. 12, 2016

(54) LOCKING MECHANISM WITH MOVABLE AND FIXED MEMBERS EACH HAVING SINGLE- AND DOUBLE LOCKING FEATURES

(75) Inventor: Hsiu Hsien Wang, Taipei (TW)

(73) Assignee: Hewlett Packard Enterprise Development LP, Houston, TX (US)

( * ) Notice: Subject to any disclaimer, the term of this patent is extended or adjusted under 35 U.S.C. 154(b) by 1041 days.

(21) Appl. No.: 12/933,833

(22) PCT Filed: Mar. 25, 2008

(86) PCT No.: PCT/US2008/058159
§ 371 (c)(1),
(2), (4) Date: Sep. 21, 2010

(87) PCT Pub. No.: WO2009/120188
PCT Pub. Date: Oct. 1, 2009

(65) Prior Publication Data
US 2011/0006653 A1   Jan. 13, 2011

(51) Int. Cl.
*H05K 5/02* (2006.01)
*G06F 1/18* (2006.01)

(52) U.S. Cl.
CPC .............. *G06F 1/181* (2013.01); *Y10T 70/5009* (2015.04)

(58) Field of Classification Search
USPC ................ 312/265.6, 223.2, 215, 222, 257.1, 312/265.5; 292/194, 195, 197, 198, 200, 292/202, 212, DIG. 11; 70/77–81, 83, 84, 70/137, 139, 168, 172, 416–418; 361/679.6, 679.58, 679.02, 724
See application file for complete search history.

(56) References Cited

U.S. PATENT DOCUMENTS

| | | | | |
|---|---|---|---|---|
| 3,083,563 | A | * | 4/1963 | Greenwald ..................... 70/417 |
| 4,584,856 | A | * | 4/1986 | Petersdorff et al. ............... 70/57 |
| 4,823,571 | A | * | 4/1989 | O'Gara .......................... 70/139 |
| 4,918,952 | A |   | 4/1990 | Lakoski et al. |
| 4,995,652 | A | * | 2/1991 | Mugnolo et al. ............. 292/202 |
| 5,249,443 | A | * | 10/1993 | Anderson ....................... 70/370 |
| 5,339,659 | A | * | 8/1994 | Guzzinati ...................... 70/120 |
| 5,548,981 | A |   | 8/1996 | Kirk |
| 5,598,323 | A | * | 1/1997 | Muller .......................... 361/726 |
| 5,823,644 | A | * | 10/1998 | Suh et al. .................... 312/223.2 |
| 5,857,364 | A | * | 1/1999 | Hsu et al. ........................ 70/120 |
| 6,000,769 | A | * | 12/1999 | Chen .......................... 312/223.2 |
| 6,038,892 | A | * | 3/2000 | Schmitt ........................... 70/78 |
| 6,209,369 | B1 | * | 4/2001 | Freck ............................ 70/375 |
| 6,598,439 | B1 | * | 7/2003 | Chen .............................. 70/423 |
| 6,698,853 | B2 | * | 3/2004 | Chen et al. .................... 312/263 |
| 6,964,184 | B1 | * | 11/2005 | Gregory .......................... 70/360 |
| 7,428,835 | B2 | * | 9/2008 | Fan et al. ......................... 70/358 |
| 7,441,696 | B2 | * | 10/2008 | Bolles ............................. 232/45 |
| 7,602,605 | B2 | * | 10/2009 | Su et al. .................... 361/679.57 |
| 7,726,751 | B2 | * | 6/2010 | Bergmann et al. ............ 312/222 |
| 7,782,611 | B2 | * | 8/2010 | Yeh et al. ................. 361/679.57 |
| 8,020,901 | B2 | * | 9/2011 | Watanabe ....................... 292/80 |
| 2006/0101874 | A1 | * | 5/2006 | Mikolajczyk et al. ............ 70/84 |
| 2007/0151313 | A1 | * | 7/2007 | Fan et al. ........................ 70/101 |
| 2008/0225475 | A1 | * | 9/2008 | Zhang et al. ................. 361/683 |
| 2009/0315342 | A1 | * | 12/2009 | Dalton et al. ................. 292/197 |

* cited by examiner

*Primary Examiner* — Daniel Rohrhoff
(74) *Attorney, Agent, or Firm* — Clifton L. Anderson

(57) ABSTRACT

A locking mechanism involves a movable member and a fixed member. The fixed member has single-locking and double-locking features, as does the movable member. The single-locking features can be engaged and disengaged by movement of the movable member orthogonal to an axis. The double-locking features can be engaged by motion of the movable member along the axis orthogonal while the single-locking features are engaged.

10 Claims, 6 Drawing Sheets

LOCKING MECHANISM WITH MOVABLE AND FIXED MEMBERS EACH HAVING SINGLE- AND DOUBLE LOCKING FEATURES

BACKGROUND OF THE INVENTION

The present invention provides security for computers and other devices that have lockable front bezels. Many computers, e.g., personal computers and workstations, have a chassis in which active computer components, such as processors, memory, and disk drives are arranged. Access to these components is typically possible through one or both sides of a chassis and through the front. During normal use, access to internal components is blocked by side-access panels and front bezels for safety and aesthetic reasons.

If a side-access panel and front bezel are readily removed, the computer may be subject to theft of components and data. To address this vulnerability, some computers provide a lock on the front bezel that can be used to lock the front bezel to the side-access panel and, in the process, lock both to the computer chassis. Thus, components and data stored thereon can be protected from theft.

Some such locking mechanisms can be circumvented. For example, one can pry the front bezel away from the front chassis wall to create a gap through which a tool can be inserted. The tool can be used to rotate the finger out of engagement with the hook without using the key. Then the front bezel and the side access panel can be removed, exposing computer innards to theft of devices and data. What is needed is an economical approach to thwarting this circumvention.

Herein, related art is described to facilitate understanding of the invention. Related art labeled "prior art" is admitted prior art; related art not labeled "prior art" is not admitted prior art.

BRIEF DESCRIPTION OF THE DRAWINGS

The figures depict implementations/embodiments of the invention and not the invention itself.

DETAILED DESCRIPTION

The present invention provides a locking mechanism with single-locking and double-locking modes. The single-locking mode involves movement of a movable member, such as the rotation of a lock finger about an axis. The double-locking mode occurs in response to movement along the axis. The locking members cannot disengage while in the double-locking mode. The double-locking mode occurs automatically when someone tries to pry the front access panel from the chassis while the members are engaged in the single-locking mode, thus thwarting attempts to circumvent the locking mechanism.

Figure 1:
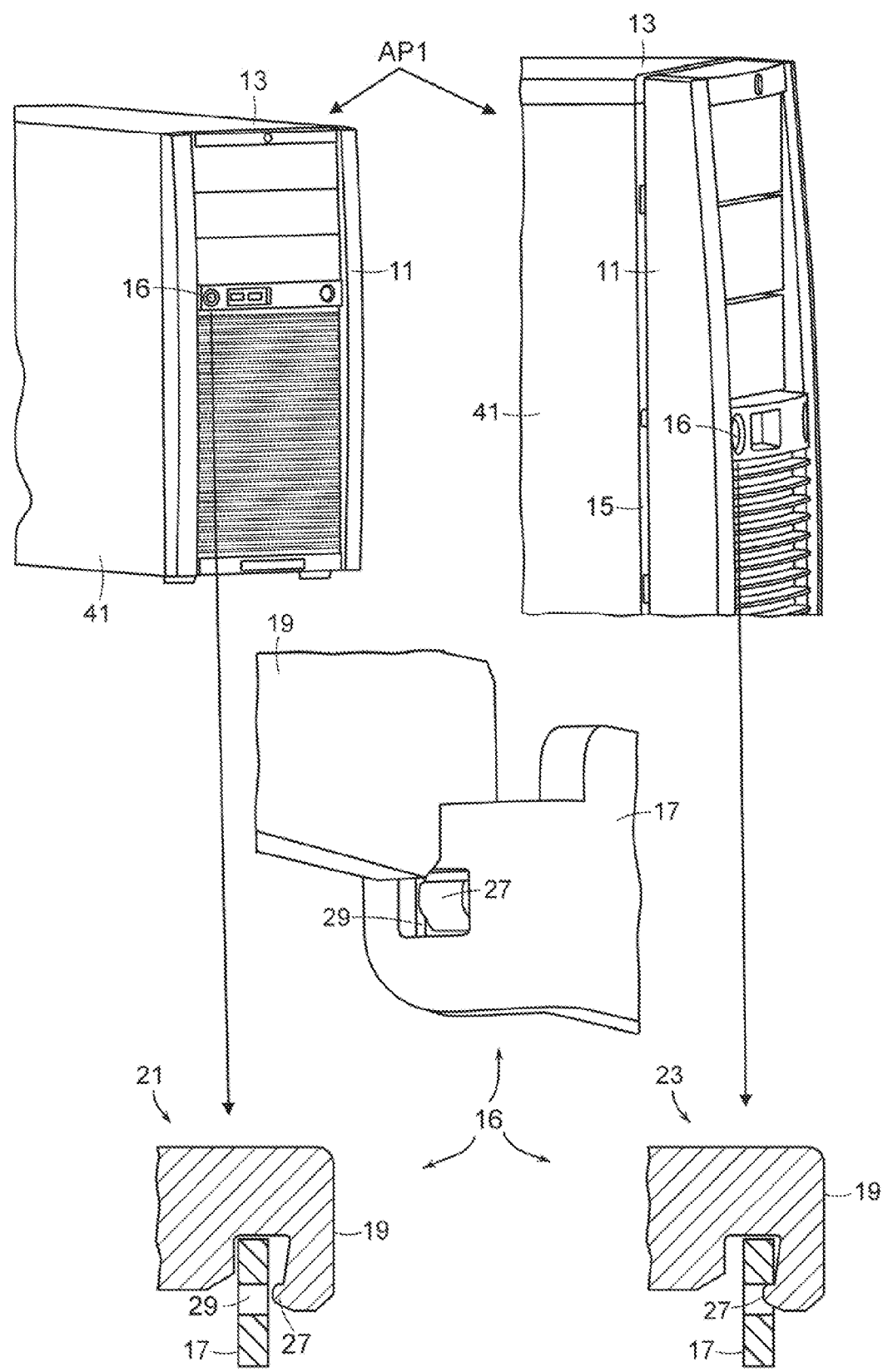
FIG. 1 illustrates the effect of prying a bezel from a chassis on a locking mechanism in accordance with an embodiment the invention. The upper left shows a computer prior to prying; the center portion shows a fixed hook and a pivotable finger engaged to lock the bezel to the chassis. The upper right shows the bezel pried apart from the chassis to leave a gap. The lower left shows the hook and finger engaged but not locked to each other. The lower right shows the hook and finger engaged and locked in response to prying.

FIG. 1 shows a tower-format computer AP1 both in a normal condition (upper left) and while a front-bezel 11 is pried away from a computer chassis 13 (upper right) to leave a gap 15. Computer AP1 provides a locking mechanism 16 to fix bezel 11 on chassis 13. Gap 15 can serve as an ingress through which a tool can be inserted in an attempt to disengage locking mechanism 16 by pivoting a locking finger 17 or other movable member from a fixed lock hook 19 or other fixed member.

Locking mechanism 16 is designed to prevent removal of bezel 11 in this manner. The movement of bezel 11 away from computer chassis 13 (while finger 17 is engaged with hook 19) forces locking mechanism 16 from a single-locking mode 21 (lower left of FIG. 1) to a double-locking mode 23 (lower right and center of FIG. 1). In single-locking mode 21, finger 17 and hook 19 are engaged so as to lock bezel 11 to chassis 13. In this mode, finger 17 can be pivoted, e.g., by use of a key (shown in FIG. 2) inserted into locking mechanism 16, so as to disengage finger 17 from hook 19, thus permitting bezel 11 to be removed from chassis 13. In double-locking mode 23, finger 17 cannot be pivoted out of engagement with hook 19.

More specifically, prying bezel 11 from chassis 13 causes a tab 27 of hook 19 to be inserted into a slot 29 of finger 17, thereby effecting double-locking mode 23. In double-locking mode, finger 17 is locked to hook 19 so that finger 17 cannot be pivoted out of engagement with hook 19.

Figure 2:
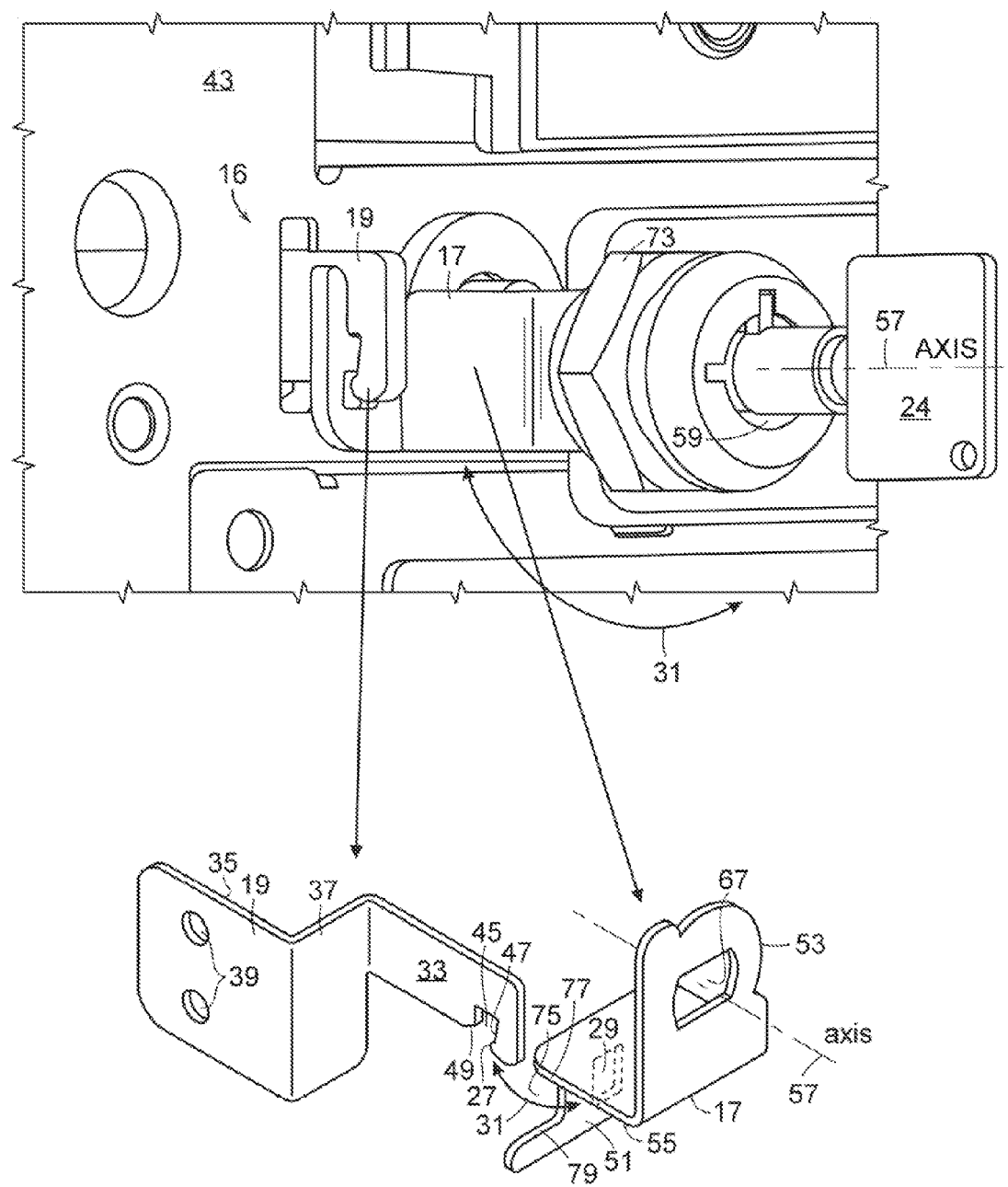
FIG. 2 provides a perspective view of the fixed hook and the pivotable finger engaged. The key-operable lock for pivoting the finger is shown, but the front bezel is invisible in FIG. 2. The bottom of FIG. 2 shows the hook and the finger in isolation.

The upper portion of FIG. 2 shows finger 17 and hook 19 in single-locking mode 21. Single-locking mode 21 can be effected by inserting key 24 into locking mechanism 16, and then rotating key 24 clockwise to pivot finger 17 (e.g., as indicated by curved arrow 31 into engagement with hook 19. Conversely, from single-locking mode 21 (FIG. 1), key 24 can be turned counterclockwise to pivot finger 17 out of engagement with hook 19 (thereby entering a non-locking mode) so that bezel 11 can be removed from chassis 13. In double-locking mode 23 (FIG. 1), finger 17 is prevented from pivoting and key 24 would be correspondingly prevented from turning. Of course, when finger 17 is not engaged with hook 19, neither locking mode is active and prying does not engage double-locking mode 23.

Figure 3:
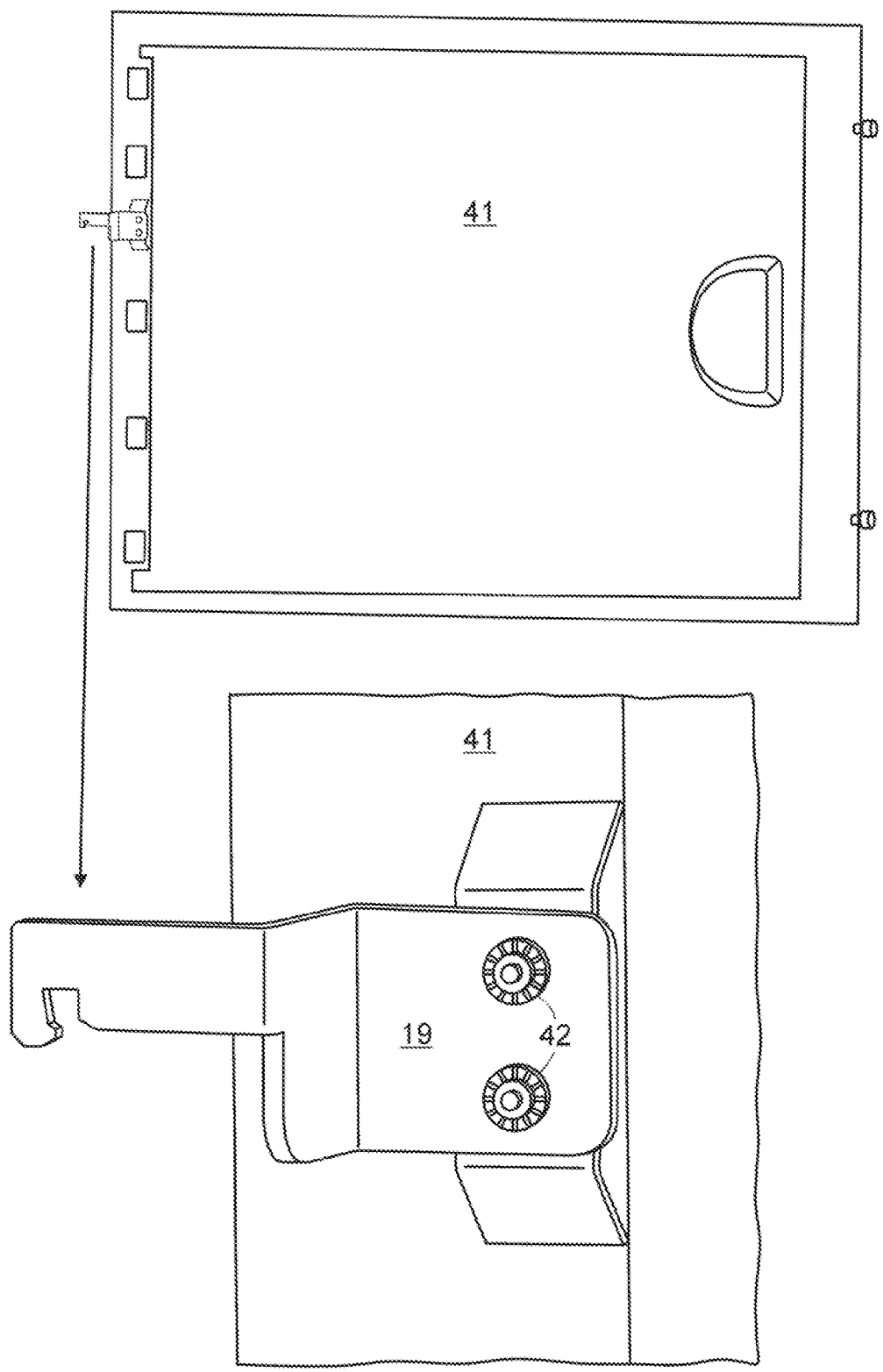
FIG. 3 shows the hook attached to a side access panel.
Figure 4:
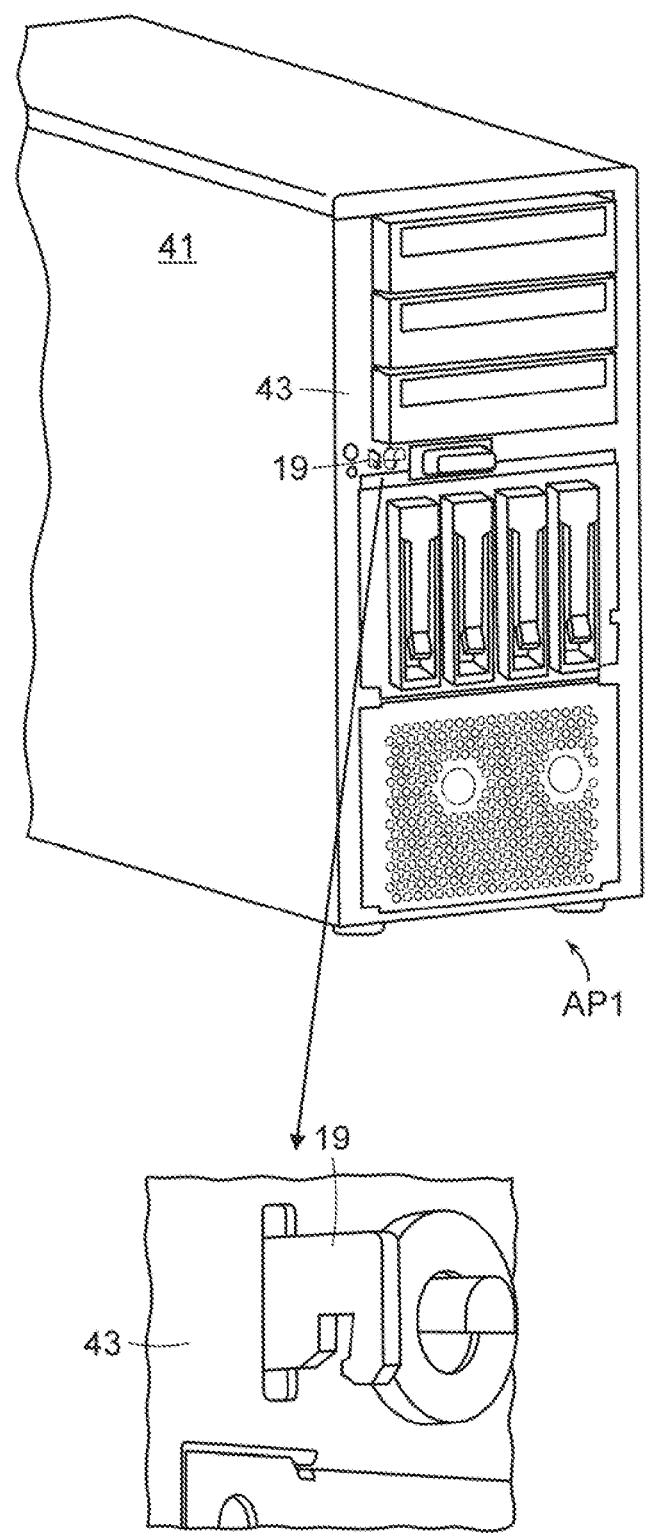
FIG. 4 shows the computer chassis with side access panel of FIG. 3 in place so that the fixed hook extends through a front wall of the chassis.

The lower portion of FIG. 2 shows finger 17 and hook 19 separately (in exploded relation to each other, the finger rotated 90 degrees counter-clockwise into an unlocked position). Hook 19 includes a forward extending hook section 33, a rearward extending attachment section 35, and an intermediate lateral section 37. Attachment section 35 includes two apertures 39 used for attachment to side access panel 41 via rivets 42, as shown in FIG. 3. For computer AP1, hook 19 is rigidly coupled to chassis 13 when side access panel 41 is installed on chassis 13, as shown in FIG. 4. In other embodiments, the fixed locking member can be attached directly to the chassis; however, attaching hook 19 to side access panel 41 allows one locking mechanism to lock both panel 41 and bezel 11 in place. The intermediate lateral section 37 extends along a front wall 43 (shown in FIG. 2) of chassis 13.

As shown in FIG. 2, hook section 33 includes a groove 45, which is the location of engagement with finger 17 when bezel 11 is locked to panel 41 and chassis 13. Groove 45 defines front and rear groove walls 47 and 49. Tab 27, used in double-locking mode 23, is defined in front groove wall 47.

Figure 5:
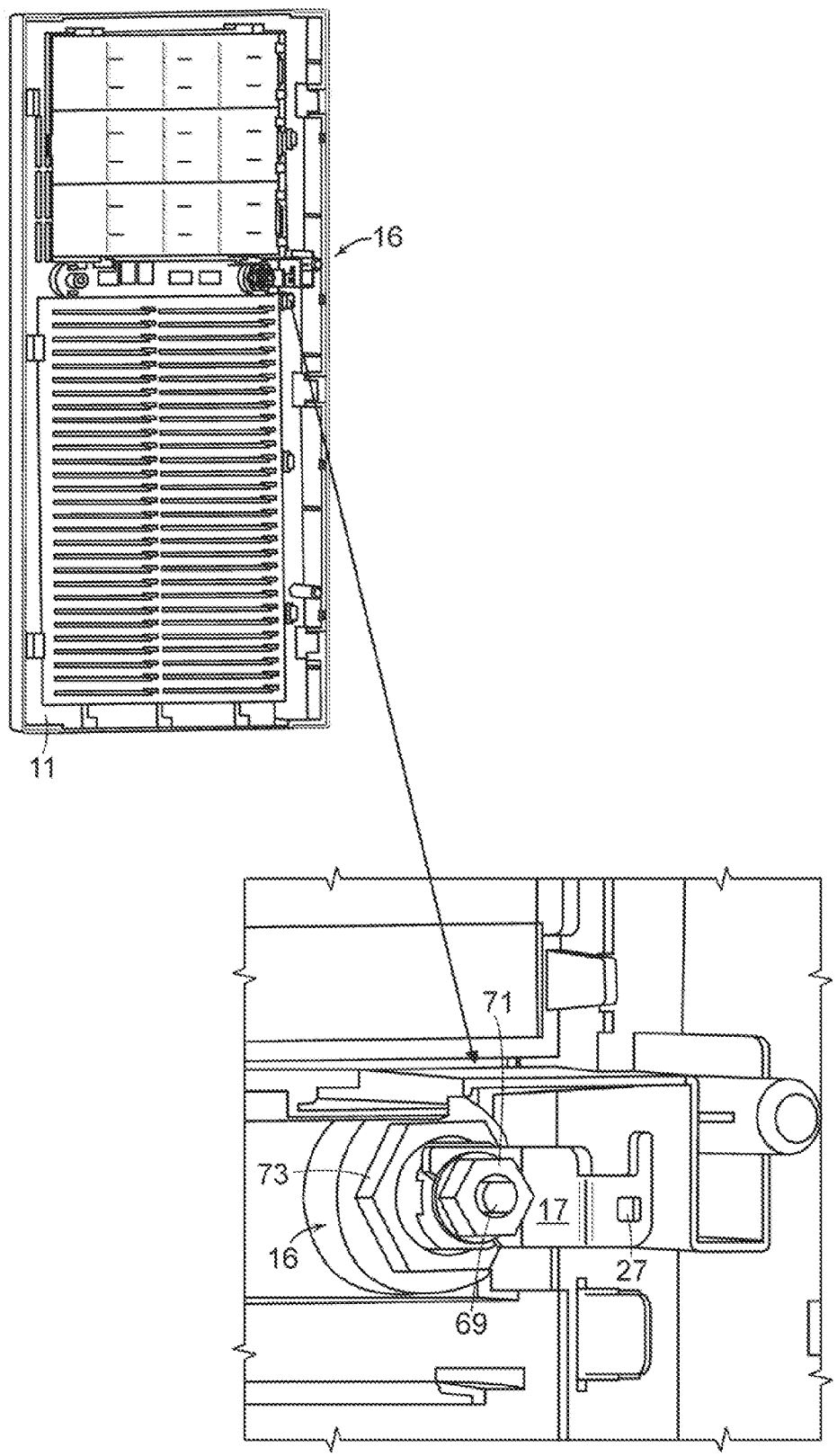
FIG. 5 shows the movable finger of FIG. 2 in the context of the back or "inward" side of the front bezel of FIG. 1.

Finger 17 includes a radially outwardly extending finger section 51, a radially inwardly extending bracket section 53, and an axially extending intermediate section 55. Intermediate section 55 extends between finger section 51 and bracket section 53 parallel to an axis 57 about which key 24 turns while inserted in a key socket 59 of locking mechanism 16 and about which finger 17 pivots. Bracket section 53 includes an elongated slot 67. As best seen in FIG. 5, a rotatable shaft 69 of locking mechanism 16 extends through slot 67 and is held in place by and between nuts 71 and 73.

As shown in FIG. 2, finger section 51 defines a groove 75 bounded by an inner wall 77 and an outer wall 79, the latter being roughly the shape of a human finger, hence the name of the component. Finger section 51 also includes a square finger slot 81. Groove 75 mates with hook groove 45 in both single-locking and double-locking modes 21 and 23 (FIG. 1). Hook tab 27 extends into finger slot 81 in and only in double-locking mode 23.

Figure 6:
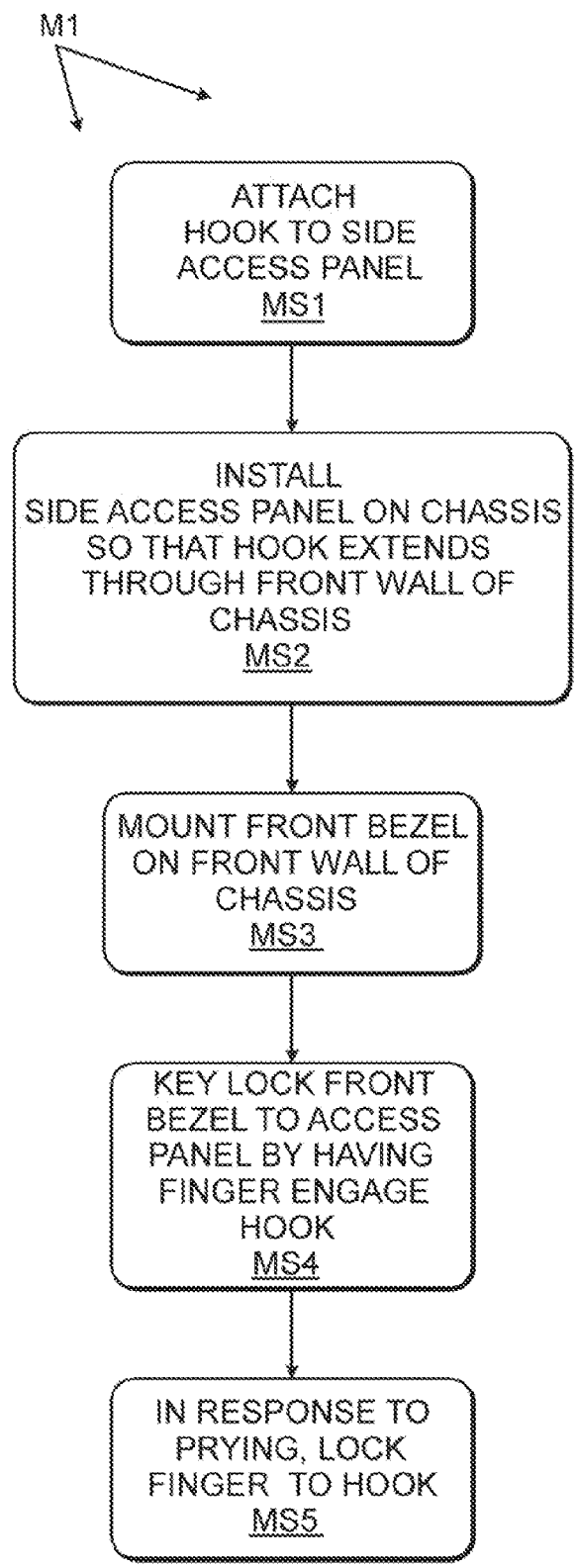
FIG. 6 is a flow chart of a method in accordance with an embodiment of the invention.

A method M1 of the invention is presented in the flow chart of FIG. 6. At method segment MS1, hook 19 is attached to side access panel 41 as shown in FIG. 3. In more general terms, the fixed locking member is attached to the side panel so that when the side panel is installed on the chassis, the fixed locking member is rigidly coupled to the chassis.

At method segment MS2, side access panel 41 is installed in chassis 13 so that hook 19 is rigidly coupled to chassis 13 and extends through chassis front wall 43 as shown in FIG. 4. At method segment MS3, front bezel 11 is mounted on chassis 13, covering front wall 43. Front bezel 11 is locked to chassis 13 when movable finger 17 engages fixed hook 19.

At method segment MS4, bezel 11 is locked to chassis 13. To this end, key 24 can be inserted into socket 59. Key 24 can be rotated clockwise so that finger 17 pivots about axis 57 until finger 17 contacts hook 19, effecting single-locking mode 21. Key 24 can then be removed. At this point, bezel 11 is locked onto chassis 13 so that it cannot be removed under normal circumstances. In addition, side access panel 41 is locked into position because it is attached to hook 19, which has engaged finger 17. Thus, the single locking mechanism 16 prevents both front and side access.

At method segment MS5, in response to a prying of bezel 11 from chassis 13, double-locking mode 23 is effected. Forward movement of bezel 11 away from chassis 13 moves finger slot 29 into engagement with hook tab 27, locking finger 17 to hook 19. This double-locking mode 23 defeats attempts to circumvent locking mechanism 16 by inserting a tool into gap 15 in an attempt to pivot finger 17 out of engagement with hook 19.

Herein, "double-locking" refers to locking of features used for single-locking so that the single-locking features cannot be disengaged without first unlocking them by disengaging the double-locking features. In other words, if component A is locked to component B by engaging member C and member D, "double-locking" involves engaging secondary features E and F so as to lock members C and D so that C cannot become disengaged from D without first disengaging features E and F. "Single-locking" refers to the condition in which members C and D are engaged but features E and F are not, so that C can be disengaged from D. Herein, "orthogonal" means more orthogonal than along; "parallel" means more parallel than orthogonal; and "along" means more along than orthogonal to.

In the illustrated embodiment, interlocking grooves 45 and 75 are the single-locking features used to effect the primary locking mode 21; finger slot 29 and hook tab 27 are the double-locking features used to effect double-locking mode 23. Those skilled in the art are aware of a wide range of possible complementary features capable of effecting locking engagement. Various embodiments incorporate various of these approaches to locking.

In the illustrated embodiment, the single-locking mode 21 is effected by rotation; in alternative embodiments, the single-locking mode can be effected by a translational (sliding) motion. The contents of the chassis can vary, they can constitute a machine, e.g., a vending machine, other than a computer. The fixed member need not be attached to a side access panel; it can be attached directly to the chassis. These and other variations upon and modifications to the illustrated embodiment are provided for by the present invention, the scope of which is defined by the following claims.

What is claimed is:

1. A locking mechanism comprising: a fixed member having fixed single-locking and fixed double-locking features; a movable member having movable single-locking and movable double-locking features, said movable single-locking feature being to engage and disengage said fixed single-locking feature via a rotation about an axis, said movable double-locking feature being to engage and disengage said fixed double-locking feature via motion parallel to said axis while said movable single-locking feature is engaged with said fixed single-locking feature.

2. A mechanism as recited in claim 1 wherein said fixed and movable single-locking features engage each other at a location radially displaced from said axis.

3. A mechanism as recited in claim 1 further comprising a computer chassis to which said fixed member is rigidly coupled and a bezel to which said movable member is pivotably mounted.

4. A mechanism as recited in claim 3 further comprising a side access panel to which said fixed member is attached, said fixed member being rigidly coupled to said chassis when said access panel is installed on said chassis.

5. A mechanism as recited in claim 1 further comprising a socket for receiving a removable key that when inserted into said socket can be used to pivot said movable member for engaging and disengaging said fixed member.

6. A mechanism as recited in claim 1 wherein said fixed and movable single-locking features define grooves and said fixed and movable double-locking features define a tab and a slot.

7. A method comprising:
having a movable single-locking feature of a movable locking member engage a fixed single-locking feature of a fixed locking member via a rotational motion about an axis; and
in the event said movable locking member is forced away from said fixed locking member in a direction parallel to said axis, having a movable double-locking feature of said movable locking member engage a fixed double-locking feature of said fixed member so as to prevent said movable single-locking feature from disengaging said fixed single-locking feature.

8. A method as recited in claim 7 further comprising rigidly coupling said fixed locking member to a computer chassis and attaching said movable locking member to a bezel so that said bezel is locked to said chassis when said movable locking member engages said fixed locking member.

9. A method as recited in claim 8 further comprising attaching said fixed locking member to a side access panel and installing said side access panel on said chassis so as to effect said rigid coupling of said fixed locking member to said chassis.

10. A mechanism as recited in claim 1 wherein said fixed and movable double-locking features when engaged, prevent disengagement of said fixed and movable single-locking features.

* * * * *